(12) United States Patent
Valdez

(10) Patent No.: US 9,133,982 B1
(45) Date of Patent: Sep. 15, 2015

(54) ARTICULATED COMPUTER MOUNTING SYSTEM

(71) Applicant: Erika Valdez, San Antonio, TX (US)

(72) Inventor: Erika Valdez, San Antonio, TX (US)

( * ) Notice: Subject to any disclaimer, the term of this patent is extended or adjusted under 35 U.S.C. 154(b) by 0 days.

(21) Appl. No.: 14/445,184

(22) Filed: Jul. 29, 2014

(51) Int. Cl.
*E04G 3/00* (2006.01)
*F16M 13/02* (2006.01)

(52) U.S. Cl.
CPC .................................. *F16M 13/022* (2013.01)

(58) Field of Classification Search
CPC combination set(s) only.
See application file for complete search history.

(56) References Cited

U.S. PATENT DOCUMENTS

| | | | |
|---|---|---|---|
| 5,673,628 A * | 10/1997 | Boos | 108/44 |
| 5,687,945 A * | 11/1997 | Lee | 248/442.2 |
| 6,378,829 B1 * | 4/2002 | Strater et al. | 248/276.1 |
| D473,562 S | 4/2003 | Russell | |
| 6,632,170 B1 * | 10/2003 | Bohanan et al. | 600/102 |
| D494,183 S | 8/2004 | Wills | |
| 6,863,252 B2 | 3/2005 | Bosson | |
| 6,896,231 B1 * | 5/2005 | Sullivan, Sr. | 248/311.2 |
| 7,124,755 B2 * | 10/2006 | Van Hooser | 128/845 |
| 7,207,537 B2 | 4/2007 | Hung | |
| 7,540,457 B2 | 6/2009 | Oddsen, Jr. | |
| 7,922,137 B2 | 4/2011 | Derry | |
| 8,083,196 B2 | 12/2011 | Chang | |
| 8,272,604 B2 | 9/2012 | Foster | |
| 8,413,943 B1 * | 4/2013 | Li | 248/454 |
| 8,636,257 B2 * | 1/2014 | Tsou et al. | 248/288.31 |
| 8,727,290 B1 * | 5/2014 | De La Matta et al. | 248/160 |
| 2005/0006542 A1 | 1/2005 | Henning | |
| 2005/0121578 A1 * | 6/2005 | Asamarai et al. | 248/284.1 |
| 2006/0261227 A1 * | 11/2006 | Petrick et al. | 248/276.1 |
| 2007/0040089 A1 * | 2/2007 | Shiff | 248/448 |
| 2010/0108828 A1 * | 5/2010 | Yu et al. | 248/123.11 |
| 2010/0198052 A1 * | 8/2010 | Jenkins et al. | 600/417 |
| 2012/0175474 A1 * | 7/2012 | Barnard et al. | 248/122.1 |
| 2012/0205503 A1 * | 8/2012 | Kobal | 248/121 |
| 2012/0273630 A1 * | 11/2012 | Gillespie-Brown et al. | 248/122.1 |
| 2014/0091193 A1 * | 4/2014 | Simon | 248/451 |
| 2014/0226281 A1 * | 8/2014 | Emami | 361/679.56 |

* cited by examiner

*Primary Examiner* — Monica Millner

(57) ABSTRACT

The articulated arm assembly for movably mounting an object to a support surface includes a hinge that may be coupled to the support surface. A cylindrical arm is operationally coupled to the hinge. The cylindrical arm is positionable at a selected position with respect to the hinge. A mounting arm is operationally coupled to the cylindrical arm. The mounting arm may support the object. The object is positionable at a selected position with respect to the support surface.

2 Claims, 5 Drawing Sheets

FIG. 1

ARTICULATED COMPUTER MOUNTING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of computer mounting systems, more specifically, articulated computer mounting systems.

SUMMARY OF THE INVENTION

An embodiment of the disclosure meets the needs presented above by generally comprising a hinge that may be coupled to the support surface. A cylindrical arm is operationally coupled to the hinge. The cylindrical arm is positionable at a selected position with respect to the hinge. A mounting arm is operationally coupled to the cylindrical arm. The mounting arm may support the object. The object is positionable at a selected position with respect to the support surface.

An object of the invention is to provide a device that is an articulated computer mounting system.

These together with additional objects, features and advantages of the articulated computer mounting system will be readily apparent to those of ordinary skill in the art upon reading the following detailed description of presently preferred, but nonetheless illustrative, embodiments of the articulated computer mounting system when taken in conjunction with the accompanying drawings.

In this respect, before explaining the current embodiments of the articulated computer mounting system in detail, it is to be understood that the articulated computer mounting system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of articulated computer mounting system.

It is therefore important that the claims be regarded as including such equivalent construction insofar as they do not depart from the spirit and scope of articulated computer mounting system. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

Figure 1:
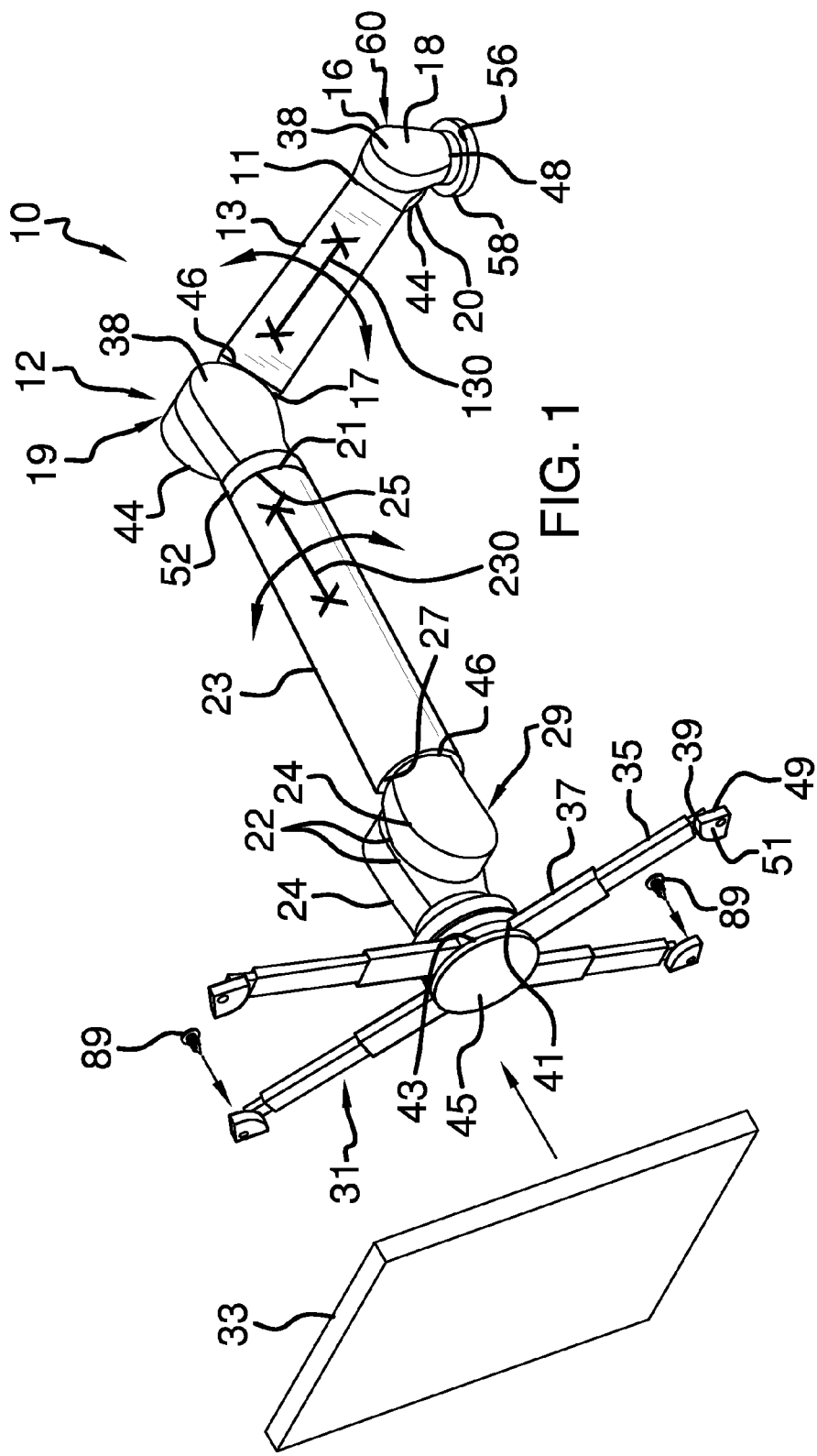
FIG. 1 is a right side perspective view of a articulated arm assembly according to an embodiment of the disclosure.
Figure 2:
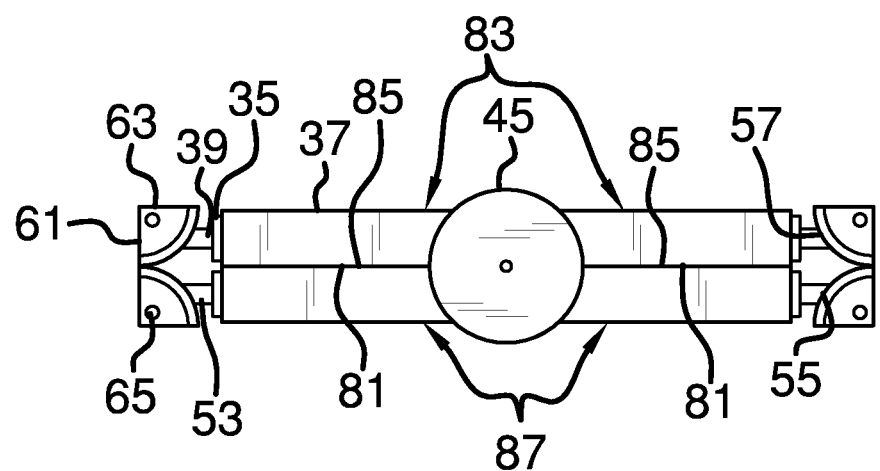
FIG. 2 is a front view of closed position of an embodiment of the disclosure.
Figure 3:
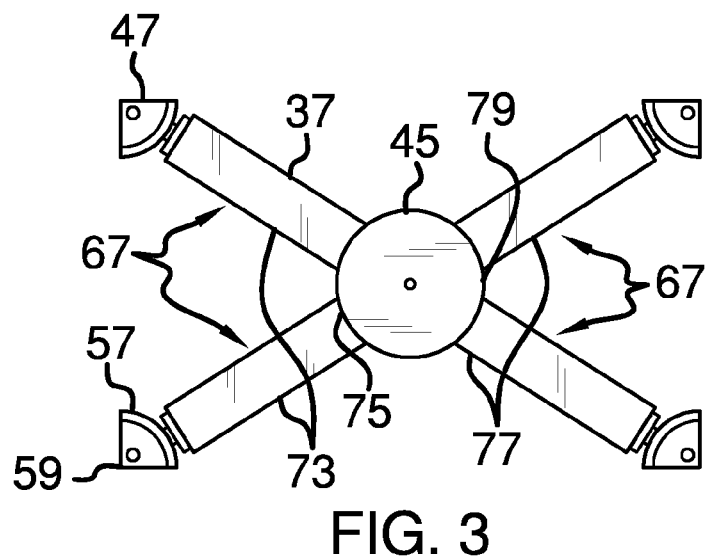
FIG. 3 is a front view of an open position of an embodiment of the disclosure.
Figure 4:
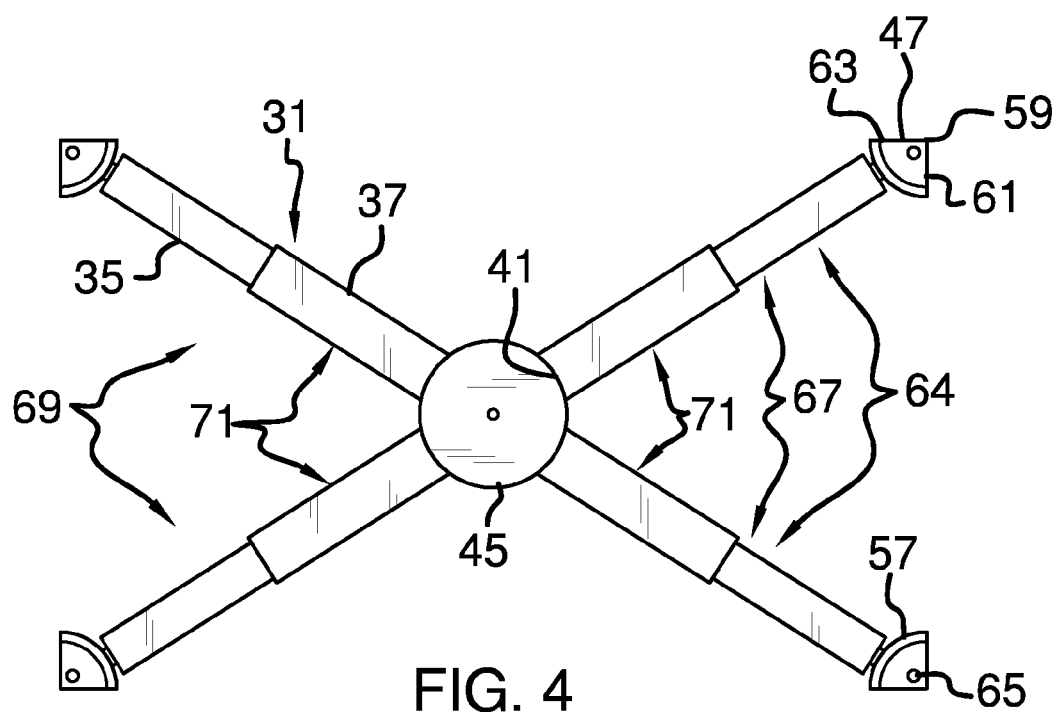
FIG. 4 is a front view of an extended position of an embodiment of the disclosure.
Figure 5:
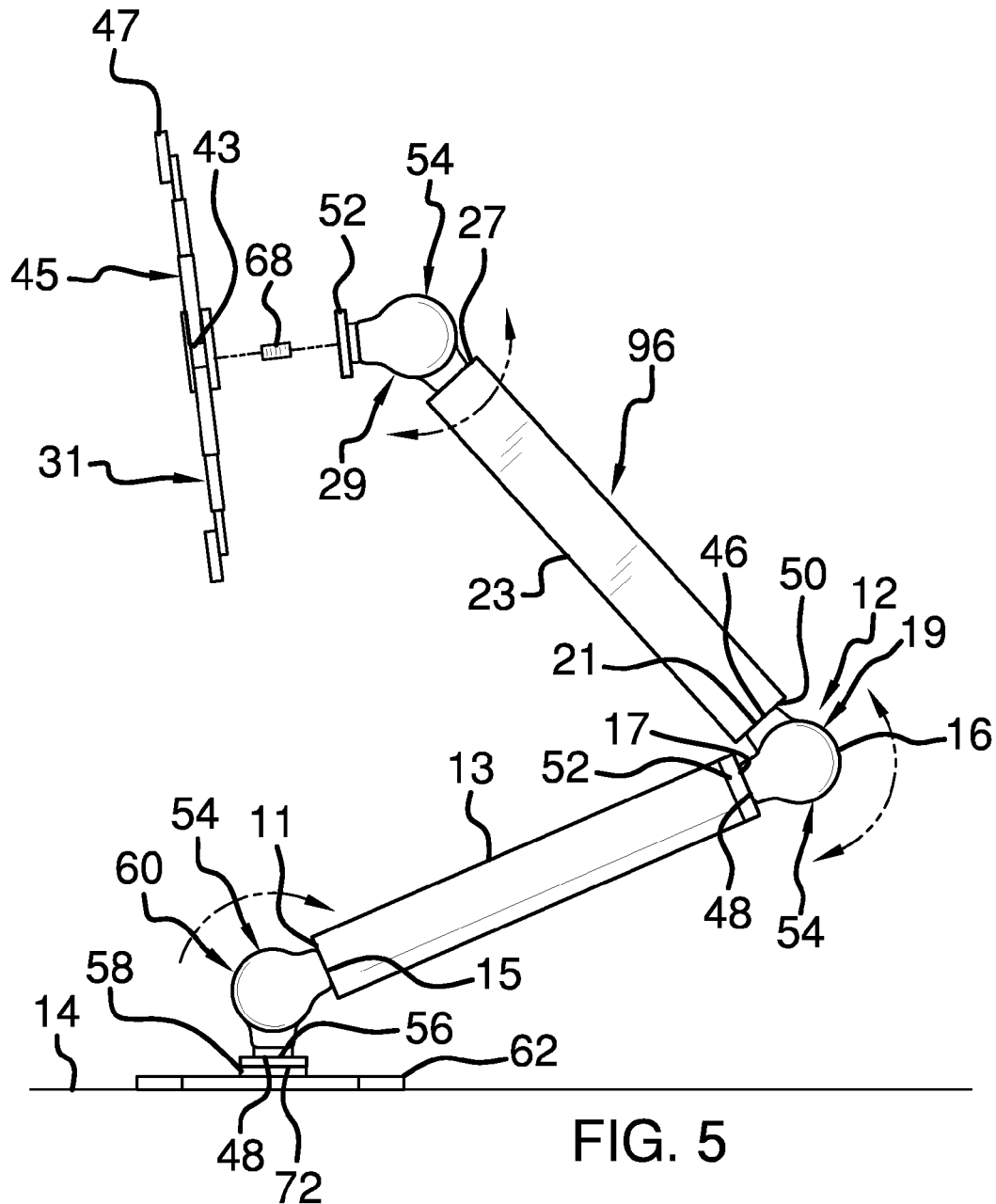
FIG. 5 is a right side view of an embodiment of the disclosure.
Figure 6:
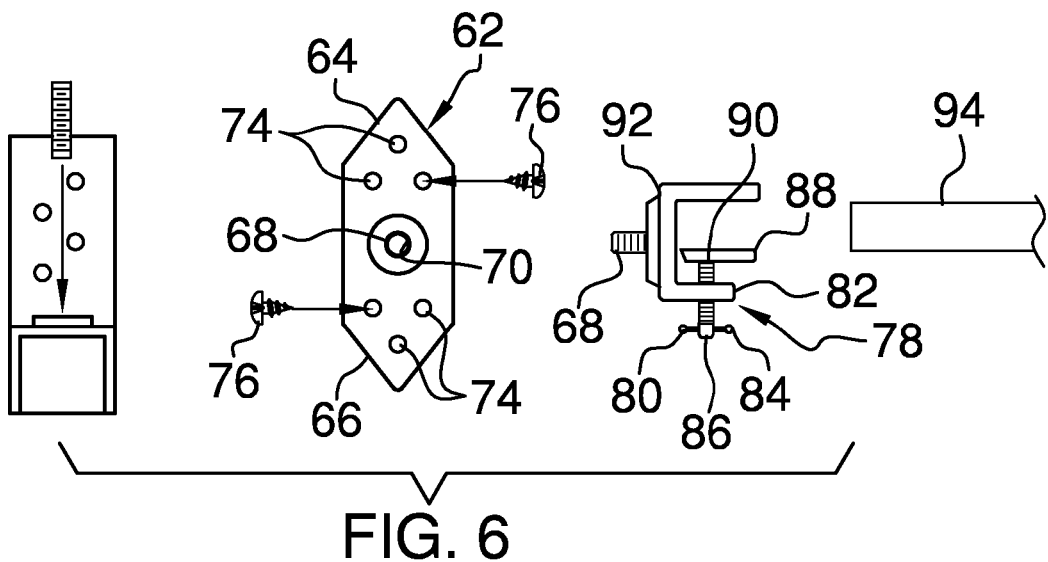
FIG. 6 is a perspective view of an embodiment of the disclosure.
Figure 7:
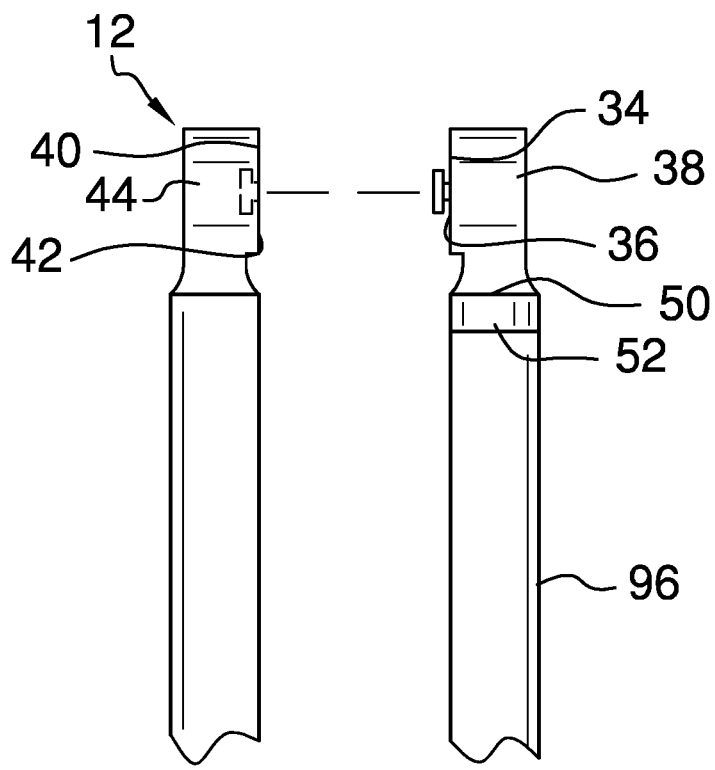
FIG. 7 is a front perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

As best illustrated in FIGS. 1 through 7, the articulated arm assembly 10 generally comprises a hinge 12 that may be coupled to a support surface 14. The support surface 14 may be a wall or other vertical support surface. An outer edge 16 of the hinge 12 is curved. The hinge 12 has a bulb shaped cross section taken along a lateral axis extending through a first lateral side 18 and a second lateral side 20 of the hinge 12.

The hinge 12 comprises a pair of internal plates 22 rotatably coupled between a pair of external plates 24. Moreover, each of the pairs of internal 22 and external 24 plates of the hinge 12 may have a length between 7 cm and 13 cm. Additionally, each of the pairs of internal 22 and external 24 plates of the hinge 12 may have a maximum height between 7 cm and 10 cm. Lastly, each of the pairs of internal 22 and external 24 plates of the hinge 12 may have a thickness between 6 mm and 12 mm.

A second lateral side 26 of a first one of the pair of internal plates 28 is coextensively coupled to a first lateral side 30 of a second one of the pair of internal plates 32. Continuing, a first lateral side 34 of the first internal plate 28 is rotatably coupled to a second lateral side 36 of a first one of the pair of external plates 38. A second lateral side 40 of the second internal plate 32 is rotatably coupled to a first lateral side 42 of a second one of the pair of external plates 44. A flat end 46 of the pair of internal plates 22 are positionable at a selected position with respect to a flat end 48 of the pair of external plates 24. The pair of internal plates 22 frictionally engages the pair of external plates 24 so the pair of internal plates 22 is retained at the selected position.

A back side 50 of a circular mount 52 is rotatably coupled to the flat end 46 of each of the first 28 and second 32 internal plates of the hinge 12. The circular mount 52 may have a diameter between 4 cm and 6 cm. Additionally, the circular mount 52 may have a thickness between 6 mm and 12 mm. Lastly, the hinge 12 is one of a plurality of the hinges 54.

A back side 56 of a circular wall mount 58 is coupled to the flat end 48 of each of the first 38 and second 44 external plates of a first one of the plurality of hinges 60. The circular wall mount 58 may have a diameter between 4 cm and 6 cm and a thickness between 6 mm and 12 mm. A wall plate 62 is provided. Each of a first lateral side 64 and a second lateral side 66 of the wall plate 62 is pointed. Moreover, a primary fastener 68 threadably engages a centrally positioned fastener aperture 70 in the wall plate 62. The primary fastener 68 additionally threadably engages a front side 72 of the circular wall mount 58 so the wall plate 62 is retained on the circular wall mount 58.

A plurality of secondary fastener apertures 74 extends through the wall plate 62. Additionally, a plurality of fasteners 76 selectively extends through an associated one of the plurality of secondary fastener apertures 74 and engages the support surface 14. The plurality of fasteners 76 retains the wall plate 62 on the support surface 14. Lastly, wall plate 62 retains the first hinge 60 on the support surface 14.

Additionally, a C-shaped mounting bracket 78 is provided. A rod 80 threadably engages a bottom arm 82 of the C-shaped mounting bracket 78. A handle 84 is coupled to a top end 86 of the rod 80. Additionally, an clamping plate 88 is coupled to a bottom end 90 of the rod 80. The handle 84 is selectively rotated so the clamping plate 88 is moved toward or away from a top arm 92 of the C-shaped mounting bracket 78.

The primary fastener 68 engages the top arm 92 of the C-shaped mounting bracket 78 so the C-shaped mounting bracket 78 is coupled to the circular wall mount 58 instead of the wall plate 62. Moreover, the C-shaped mounting bracket 78 is coupled to the circular wall mount 58 if the assembly 10 is to be coupled to an alternative support structure 94. The alternative support structure 94 may be a headboard on a bed. Lastly, the handle 84 on the rod 80 is rotated so the clamping plate 88 retains the alternative support structure 94 between the clamping plate 88 and the top arm 92 of the C-shaped mounting bracket 78.

A hemi-cylindrical arm 96 is operationally coupled to the hinge 12. The hemi-cylindrical arm 96 may have a length between 30 cm and 45 cm. Additionally, the hemi-cylindrical arm 96 may have a diameter between 4 cm and 6 cm. The hemi-cylindrical arm 96 is one of a pair of hemi-cylindrical arms 98.

A first end 11 of a first hemi-cylindrical arm 13 is one of the pair of the hemi-cylindrical arms 98 that is coupled to a front side 15 of the circular mount 52 on the first hinge 60. Moreover, a second end 17 of the first hemi-cylindrical arm 13 is coupled to the flat end 46 of each of the first 38 and second 44 external plates of a second one of the plurality of hinges 19. The second hinge 19 rotates with the first hemi-cylindrical arm 13 if the circular mount 52 on the first hinge is rotated 60.

A first end 21 of a second hemi-cylindrical arm 23 is one of the pair of hemi-cylindrical arms 96 is coupled to a front side 25 of the circular mount 52 on the second hinge 19. Moreover, a second end 27 of the second hemi-cylindrical arm 23 is coupled to the flat end 46 of each of the first 38 and second 44 external plate of a third one of a plurality of hinges 29. The second hemi-cylindrical arm 23 is positionable at a selected angle with respect to the first hemi-cylindrical arm 13. Additionally, the third hinge 29 rotates with the second hemi-cylindrical arm 23 if the circular mount 52 on the second hinge 19 is rotated.

A mounting arm 31 is operationally coupled to the second cylindrical arm 23 so the mounting arm 31 may support an object 33. The object 33 may be a tablet personal computer of any conventional design. Continuing, the object 33 is positionable at a selected position with respect to the support surface 14 or the alternative support structure 94.

A middle portion 35 of the mounting arm 31 is slidably coupled to a basal portion 37 of the mounting arm 31. Further, a top portion 39 of the mounting arm 31 is slidably coupled to the middle portion 35 of the mounting arm 31. The mounting arm 31 has a telescopically adjustable length that may range between a minimum length of 5 cm and a maximum length of 12 cm. A bottom end 41 of the basal portion 37 of the mounting arm 31 is movably coupled to a back side 43 of a mounting arm plate 45.

A primary fastener 68 threadably engages the circular mount 52 on the third hinge 29. Continuing, the back side 43 of the mounting arm plate 45 threadably receives the primary fastener 68. The mounting arm plate 45 is spaced apart from the circular mount 52 on the third hinge 29. Lastly, the mounting arm 31 is positioned between the mounting arm plate 45 and the circular mount 52 on the third hinge 29.

A retainer 47 has a pie slice cross section taken along a longitudinal axis extending through a front side 49 and a back side 51 of the retainer 47. The retainer 47 may be comprised of a resiliently compressible material such as rubber or other similar material. Continuing, the back side 51 of the retainer 47 is coupled to a front side 53 of the top portion 39 of the mounting arm 31. Further, the retainer 47 is positioned proximate a free end 55 of the top portion 39 of the mounting arm 31.

A round end 57 of the retainer 47 is positioned proximate the free end 55 of the top portion 39 of the mounting arm 31. Moreover, a pointed end 59 of the retainer 47 is directed longitudinally away from the free end 55 of the top portion 39 of the mounting arm 31. Each of a first lateral edge 61 and a second lateral edge 63 of the retainer 47 forms a right angle at the pointed end 59 of the retainer 47. Lastly, a fastener aperture 65 extends through the front side 49 and the back side 51 of the retainer 47.

The mounting arm 31 is one of a plurality of the mounting arms 67. Moreover, the plurality of mounting arms 67 comprises a pair of sets of the mounting arms 69. The pair of sets of the mounting arms 69 comprises a pair of the mounting arms 71. Each of a first one of the pair of sets of the mounting arms 73 is positioned proximate a first lateral side 75 of the mounting arm plate 45. Moreover, each of a second one of the pair of sets of the mounting arms 77 is positioned proximate a second lateral side 79 of the mounting arm plate 45. Each of the plurality of mounting arms 67 may be moved independently of the remaining ones of the plurality of mounting arms 67.

The plurality of mounting arms 67 are positionable in a deployed position so the plurality of mounting arms 67 forms an X-shape. Moreover, the plurality of mounting arms 67 is positionable in a stored position. In the stored position, a bottom side 81 of a top one of each of the pair of sets of mounting arms 83 abuts a top side 85 of a bottom one of each of the pair of sets of mounting arms 87.

The object 33 is selectively coupled to the front side 49 of the retainer 47 on each of the first 73 and second 77 sets of mounting arms. A plurality of fasteners 89 may extend through a the fastener aperture 65 in an associated one of the plurality of retainers 47. The plurality of fasteners 89 may engage the object 33 so the object 33 is retained on the plurality of retainers 47.

In use, the assembly 10 is coupled to either the support surface 14 or the alternative support structure 94. Continuing, the first 13 and second 23 hemi-cylindrical arms are positioned so the plurality of mounting arms 67 are positioned proximate a user. The plurality of mounting arms 67 are positioned so each of the plurality of retainers 47 is positioned proximate an associated one of four corners of the object 33. Further, the object 33 is coupled to the plurality of retainers 47 so the object 33 is accessible to the user.

Referring to FIG. 1, it shall be noted that the first hemi-cylindrical arm 13 is able to rotate with respect to a first longitudinal axis 130. The second hemi-cylindrical arm 23 is able to rotate with respect to a second longitudinal axis 230. Thus, both the first hemi-cylindrical arm 13 and the second hemi-cylindrical arm 23 are rotatably engaged with respect to the second external plate 44 and the first external plate 38, respectively.

With respect to the above description, it is to be realized that the optimum dimensional relationship for the various components of the articulated arm assembly 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the articulated arm assembly 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An articulated arm assembly for movably mounting an object to a support surface, said assembly comprising:
   a hinge configured to be coupled to the support surface;
   a hemi-cylindrical arm operationally coupled to said hinge wherein said hemi-cylindrical arm is positionable at a selected position with respect to said hinge; and
   a mounting arm operationally coupled to said hemi-cylindrical arm wherein said mounting arm is configured to support the object wherein the object is positionable at a selected position with respect to the support surface;
   wherein an outer edge of said hinge being curved wherein said hinge has a bulb shaped cross section taken along a lateral axis extending through a first lateral side and a second lateral side of said hinge;
   wherein a back side of a circular mount rotatably coupled to a flat end of each of a first and second internal plate of said hinge;
   wherein said hinge being one of a plurality of hinges;
   wherein said hemi-cylindrical arm being one of a pair of hemi-cylindrical arms;
   wherein said hinge comprising a pair of internal plates rotatably coupled between a pair of external plates;
   wherein a second lateral side of a first one of said pair of internal plates being coextensively coupled to a first lateral side of a second one of said pair of internal plates;
   wherein a first lateral side of said first internal plate being rotatably coupled to a second lateral side of a first one of said pair of external plates;
   a second lateral side of said second internal plate being rotatably coupled to a first lateral side of a second one of said pair of external plates;
   a back side of a circular wall mount coupled to a flat end of each of a first and second external plate of a first one of a plurality of hinges;
   a front side of said circular wall mount being coupled to the support surface wherein said first hinge is retained on the support surface;
   a first end of a first hemi-cylindrical arm is coupled to a front side of a circular mount on a first hinge wherein a second end of said first hemi-cylindrical arm is coupled to flat end of each of first and second external plates of a second one of a plurality of hinges;
   a first end of a second hemi-cylindrical arm is coupled to a front side of a circular mount on a second hinge wherein a second end of said second hemi-cylindrical arm is coupled to a flat end of each of a first and second external plate of a third one of a plurality of hinges;
   wherein the first hemi-cylindrical arm and the second hemi-cylindrical arm comprise the pair of hemi-cylindrical arms;
   wherein said second hemi-cylindrical arm is positionable at a selected angle with respect to said hemi-first cylindrical arm;
   wherein the first hemi-cylindrical arm is able to rotate with respect to a first longitudinal axis; wherein the second hemi-cylindrical arm is able to rotate with respect to a second longitudinal axis; wherein both the first hemi-cylindrical arm and the second hemi-cylindrical arm are rotatably engaged with respect to the second external plate and the first external plate, respectively;
   wherein a middle portion of said mounting arm being slidably coupled to a basal portion of said mounting arm;
   a top portion of said mounting arm being slidably coupled to said middle portion of said mounting arm wherein said mounting arm has a telescopically adjustable length;
   a bottom end of said basal portion of said mounting arm being movably coupled to a back side of a mounting arm plate.

2. The assembly according to claim 1 wherein:
   a retainer having a pie slice cross section taken along a longitudinal axis extending through a front side and a back side of said retainer; and
   said back side of said retainer being coupled to a front side of a top portion of said mounting arm proximate a free end of said top portion of said mounting arm wherein a round end of said retainer is positioned proximate said free end of said top portion of said mounting arm such that a pointed end of said retainer is directed longitudinally away from said free end of said top portion of said mounting arm;
   wherein said mounting arm being one of a plurality of said mounting arms;
   wherein said plurality of mounting arms comprising a pair of sets of said mounting arms;
   said pair of sets of said mounting arms comprising a pair of said mounting arms;
   each of a first one of said pair of sets of said mounting arms being positioned proximate a first lateral side of a mounting arm plate;
   each of a second one of said pair of sets of said mounting arms being positioned proximate a second lateral side of said mounting arm plate; and
   the object being coupled to a front side of a retainer on each of said first and second sets of mounting arms wherein the object is retained on said plurality of mounting arms.

* * * * *